No. 666,473. Patented Jan. 22, 1901.
J. B. DENLINGER.
BAND CUTTER AND FEEDER.
(Application filed June 1, 1900.)
(No Model.) 2 Sheets—Sheet 1.
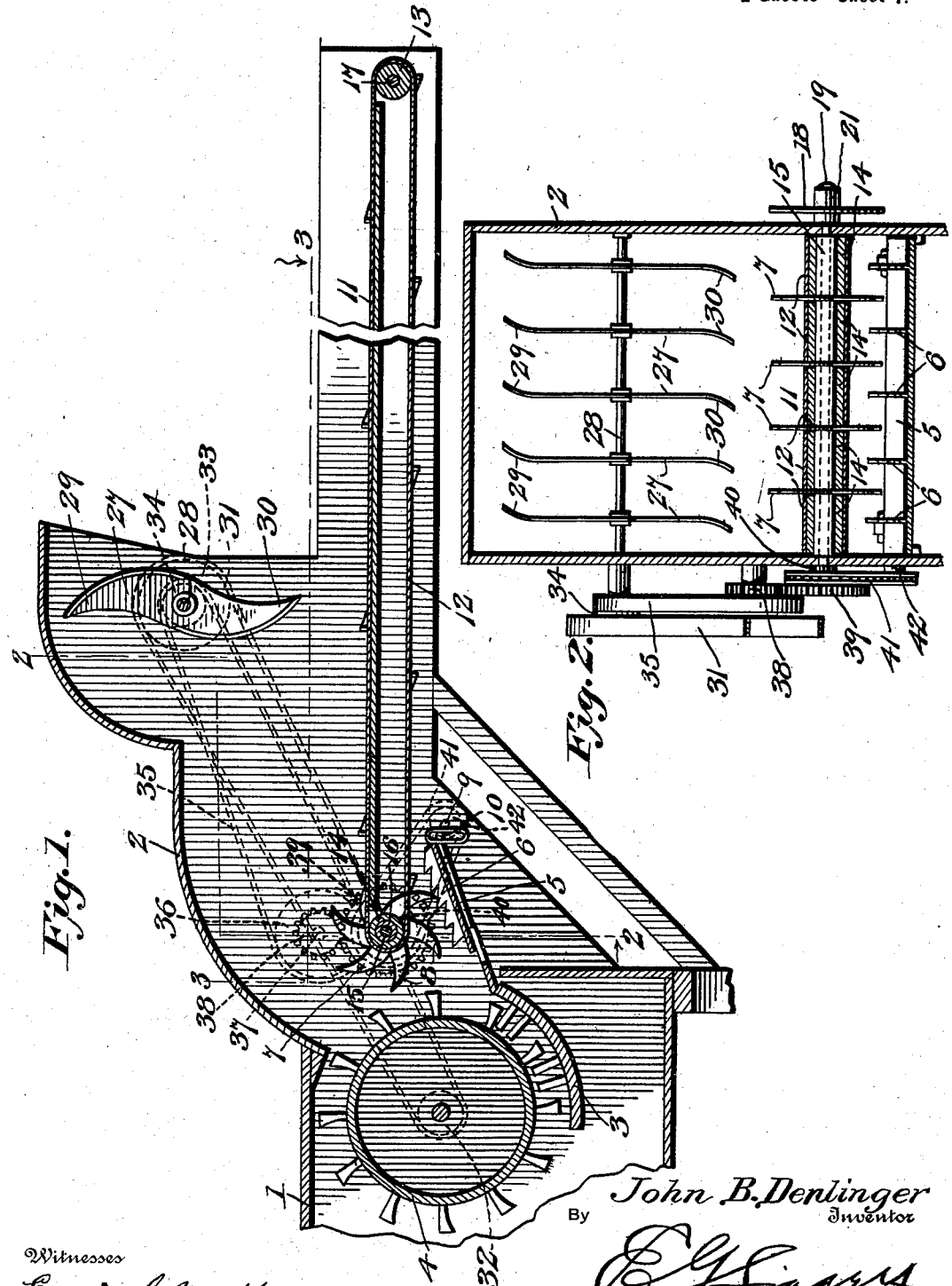
Witnesses
Edwin G. McKee.
John B. Denlinger
Inventor
By
Attorney
THE NORRIS PETERS CO., PHOTO-LITHO., WASHINGTON, D. C.

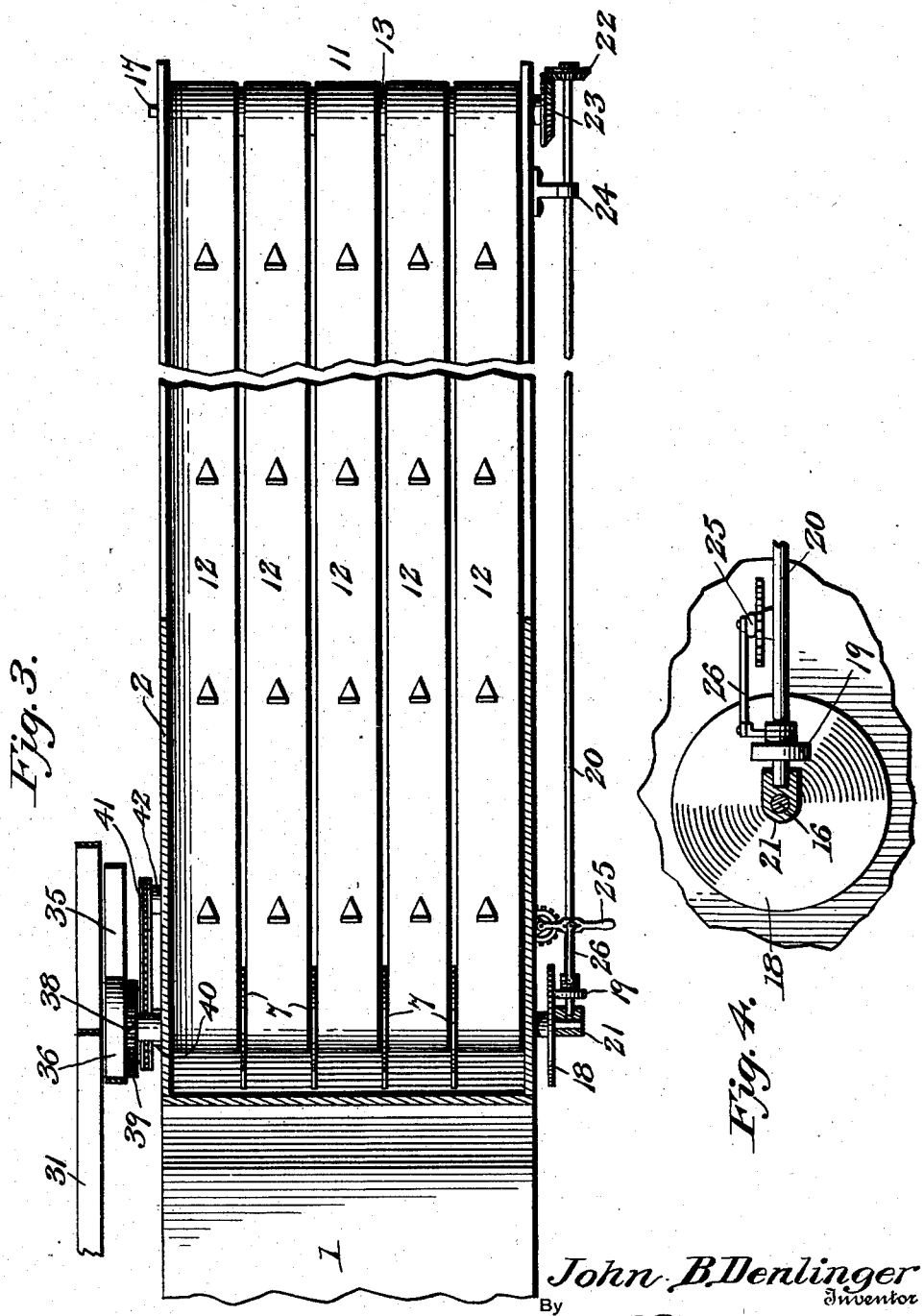

UNITED STATES PATENT OFFICE.

JOHN B. DENLINGER, OF HILL GROVE, OHIO, ASSIGNOR OF ONE-HALF TO BENJAMIN F. DENLINGER, OF SAME PLACE.

BAND-CUTTER AND FEEDER.

SPECIFICATION forming part of Letters Patent No. 666,473, dated January 22, 1901.

Application filed June 1, 1900. Serial No. 18,736. (No model.)

*To all whom it may concern:*

Be it known that I, JOHN B. DENLINGER, a citizen of the United States, residing at Hill Grove, in the county of Darke and State of Ohio, have invented a new and useful Band-Cutter and Feeder, of which the following is a specification.

This invention relates to band-cutters and feeders, and has for one object the improvement of machines of this character whereby headed and bundled grain may be fed into the cylinder of a threshing-machine in orderly and evenly-distributed arrangement.

A further object is to provide for any desired variation of speed between the bundle-carrier and the rotary distributers and to provide a more effective coöperative relation between the distributer or feeder and the bundle-carrier.

With these and other objects in view, all as will more fully appear, the invention consists in the novel construction and arrangement of parts hereinafter to be described, illustrated in the accompanying drawings, and succinctly defined in the appended claims.

In the accompanying drawings, Figure 1 is a central longitudinal section through the feed end of a threshing-machine. Fig. 2 is a sectional view on the line 2 2 of Fig. 1. Fig. 3 is a sectional view on the line 3 3 of Fig. 1 looking in the direction of the arrows. Fig. 4 is a detail view of the variable-speed gearing between the regulator-shaft and the bundle-carrier.

Referring to the numerals of reference employed to designate corresponding parts in the several views, 1 indicates a portion of a threshing-machine frame, 2 the usual cutter and feeder box, 3 the concave, and 4 one of the threshing-cylinders, all constructed and arranged substantially in the ordinary manner.

Immediately in front of the concave 3 is arranged the grain-return board 5, inclined at the desired angle and provided with a series of longitudinally-disposed serrated or toothed bars 6, disposed below the rotary feed-regulators 7, the curved distributing-fingers 8 of which extend between the bars 6 to permit the latter to detach the straw which may have become entangled in the fingers of the regulators. For vibrating the return-board 5 any suitable means may be employed—as, for instance the rock-shaft 9, operated by suitable gearing upon the exterior of the thresher and connected to the board by a crank connection 10.

The bundle-carrier or feed-conveyer 11, disposed horizontally and having its inner end located above the return-board and in position to discharge the grain between the concave 3 and cylinder 4, is made up of a transverse series of endless sections or belts 12. At the outer end of the conveyer the several belts or sections pass around and are driven and supported by a driving-roller 13, and at the inner end they pass around and are idly carried by a series of idlers 14, one being provided for each belt and loosely mounted upon the extended cylindrical hubs and spacers 15 of the regulators or distributers 7, which latter are mounted, as best shown in Fig. 2 of the drawings, in coaxial parallel relation between the several belts 12—that is to say, the distributers are located intermediate of the belts, so that their curved fingers will move in a path disposed between the notched bars 6 of the return-board 5 and between the sections of both the upper and lower runs of the bundle-carrier. This peculiar relation of the distributer or regulator permits the grain fed to the machine upon the carrier 11 to be advanced to and deposited between the fingers of the distributer for delivery in orderly arrangement to the threshing mechanism, as distinguished from that tangled condition in which the grain is delivered to the concave when the distributer is arranged in position to kick the grain after it passes from the carrier or to loosen it with a teetering action during its passage over the return-board. It is necessary, however, according to the condition of the grain, to loosen the straw by a more or less rapid rotation of the distributers relative to the movement of the bundle-carrier, and to accomplish any desired relative change of speed of the distributer-shaft 16 and carrier-shaft 17, one of which supports the distributers and idlers and the other of which carries the roller 13, I provide a simple and effective form of feed-changing gearing which transmits motion from the distributer-shaft to the carrier-shaft and may be quickly shifted by the operator to obtain such relative speeds as may be necessary to secure the most effective operation of the mechanism under all conditions. The speed-changing gearing comprises a comparatively large friction-disk 18, mounted upon one end of the distributer-shaft 16 and in frictional contact with a small friction-pinion 19, keyed to, but longitudinally movable upon, a power-transmitting shaft 20, journaled at one end in a bearing 21, common to the shafts 20 and 16, and provided at its opposite end with a beveled gear-wheel 22, meshing with a somewhat larger bevel gear-wheel 23, keyed upon one end of a carrier-shaft 17, the shaft 20 being provided adjacent to its outer end with a suitable bearing 24, carried by the frame of the feeder-box. Obviously as the friction-pinion 19 contacts with the friction-disk 18 nearer to or farther from the axis of the latter the speed of the carrier relative to the distributer will be decreased or increased. For the purpose of shifting the pinion therefor I provide a speed-changing lever 25, carried by the frame of the cutter-box and provided with a shifting-rod 26, connected to the hub of the friction-pinion 19 in a manner to cause the pinion to be shifted upon the shaft when the lever is swung without interfering with the rotary movement of said pinion under the impulse of the rotating disk 18. As the sheaves are fed to the machine upon the carrier 11 their bands are cut shearingly by the band-cutters 27, carried upon the cutter-shaft 28 and having their opposite ends 29 and 30 deflected laterally in opposite directions, as best seen in Fig. 2 of the drawings. The deflection of the cutters insures the severing of the sheave-bands with a shearing cut and precludes the possibility of failure to destroy the integrity of unusually tenacious bands surrounding unusually light sheaves, which yield to a considerable degree when the band is struck by the rotating cutter.

Various forms of mechanism may be devised for operating the shafts 9, 16, and 28; but I have originated what appears to be a desirable form of power-transmitting mechanism, which comprehends a belt 31, passing around pulleys 32 and 33 upon the shaft of the concave and the shaft 28, respectively. A somewhat smaller pulley 34, carried by the shaft 28, is geared in turn by a belt 35 to the idler-pulley 36, mounted on a shaft 37, upon which shaft is also keyed a comparatively small gear-wheel 38, meshing with a somewhat larger gear-wheel 39, keyed upon the shaft 16, said shaft being provided with a pulley 40, geared by a belt 41 to a comparatively small pulley 42 upon the shaft 9.

In operation, the speed-changing lever 25 having been shifted to obtain the desired relative speeds of the carrier and distributer, the sheaves or bundles of grain are deposited upon the bundle-carrier 11 and are presented to the band-cutters 27, which sever the bands with a shearing cut. The unbound grain travels toward the distributers and is properly distributed and fed thereby as it reaches the end of the bundle-carrier and is deposited therefrom into the concave 3, the bars 6 and the upper and lower runs of the carrier serving to clear the fingers of the distributers, which latter operate upon the grain while it is still supported by the conveyer, as distinguished from the usual arrangement of these devices, which permits the grain to be thrown by the carrier upon a run or incline through which the fingers of the distributers project.

The advantages arising from the arrangement specified are various; but those most apparent are the effectual clearing of the distributer-fingers, the loosening and distributing of the grain before it passes from the carrier, the compact arrangement of operative parts within the cutting and feeding box, and the utilization of a single shaft for the purpose of supporting the distributers and the inner end of the bundle-carrier.

While the present embodiment of my invention appears at this time to be preferable, I desire to be understood as reserving the right to effect such changes, modifications, and variations as may come within the scope of the protection prayed.

What I claim is—

1. In a band-cutter and feeder, the combination with a frame, of an endless bundle-carrier extending into the frame, rotary supports at the opposite ends of the bundle-carrier, a plurality of rotary distributers mounted at the inner end of the carrier and below its supporting-surface but extended above the carrier to loosen the grain carried thereon, means for rotating the rotary support at the outer end of the bundle-carrier, and variable gearing intermediate of said last-named rotary support and the distributers located at the inner end of the bundle-carrier, whereby the rotary supports and the rotary distributers are rotated at different speeds, said distributers being mounted for movement independent of the rotary carrier-supports.

2. In a band-cutter and feeder, the combination with a frame, of an endless bundle-carrier extending into the frame, a rotary support for the inner end thereof, a plurality of rotary distributers mounted at the inner end of the carrier and coaxial with said rotary support and extending through and above said supporting-surface to loosen the grain carried thereon, and speed-changing mechanism in operative relation with the carrier and distributers for regulating the relatively variable speeds thereof, the rotary support for the inner end of the carrier being mounted for rotation independent of the rotary distributers.

3. In a band-cutter and feeder, the combination with a frame, of a distributer-shaft, a plurality of rotary distributers mounted on said shaft, idlers intermediate of the distributers, a bundle-carrier composed of suitably supported endless sections passed around the idlers, and means for driving the distributer-shaft and carrier at different speeds.

4. In a band-cutter and feeder, the combination with a frame, a distributer-shaft, and a carrier-shaft, of a plurality of rotary distributers mounted upon the distributer-shaft, means for effecting the rotation of said shafts at different and relatively variable speeds, idlers intermediate of the distributers, a roller mounted upon the carrier-shaft, and a bundle-carrier composed of endless sections each of which is passed around an idler and around the carrier-roller.

5. In a band-cutter and feeder, the combination with a frame, a distributer-shaft, a carrier-shaft, and speed-changing gearing intermediate of said shafts for effecting the rotation of said shafts at different speeds, of a series of rotary distributers mounted upon the distributer-shaft, idlers intermediate of the distributers, a roller upon the carrier-shaft, a bundle-carrier comprising a series of endless belts passed around the idlers and around the carrier-roller, to permit the clearing of the distributers as they pass through the carrier, and a series of vibrating notched bars between which the distributers extend at a point below the bundle-carrier.

6. In a band-cutter and feeder, the combination with a distributer-shaft, a plurality of rotary distributers thereon and an idler on said distributer-shaft, of an endless bundle-carrier passed around the idler, a carrier-shaft likewise supporting the bundle-carrier, a friction-disk mounted upon the distributer-shaft, a power-transmitting shaft geared to the carrier-shaft, and a shiftable friction-pinion mounted on the power-transmitting shaft in contact with the face of the friction-disk for the purpose of varying the relative speeds of the bundle-carrier and distributers.

7. In a band-cutter and feeder, the combination with a distributer-shaft, a carrier-shaft and means for operating the distributer-shaft, of a series of distributers having extended hubs mounted upon the distributer-shaft, an idler mounted upon each hub, a roller carried by the carrier-shaft, a bundle-carrier composed of a plurality of endless sections each passed around an idler and the carrier-roller, a friction-disk upon the distributer-shaft, a power-transmitting shaft geared to the carrier-shaft, a shiftable friction-pinion mounted on the power-transmitting shaft in operative contact with the friction-disk, and a speed-changing lever operatively connected with the friction-pinion to shift the latter and thereby regulate the relative speeds of the carrier and distributers.

In testimony that I claim the foregoing as my own I have hereto affixed my signature in the presence of two witnesses.

JOHN B. DENLINGER.

Witnesses:
   CHAS. A. SEIFERT,
   JAMES B. MCKENZIE.